(12) United States Patent
Vlodavsky et al.

(10) Patent No.: US 7,330,972 B2
(45) Date of Patent: Feb. 12, 2008

(54) REMOTE MANAGEMENT DEVICE KEY ADMINISTRATION USING NETWORK ADAPTERS

(75) Inventors: Zvi Vlodavsky, Mevaseret-Zion (IL); Eli Kupermann, Maale-Adumin (IL); Nimrod Diamant, Kfar-Sabe (IL); Gil Baruch, Mevaseret-Zion (IL); Ariel Malamud, Jerusalem (IL)

(73) Assignee: Intel Corporation, Santa Clara, CA (US)

( * ) Notice: Subject to any disclaimer, the term of this patent is extended or adjusted under 35 U.S.C. 154(b) by 832 days.

(21) Appl. No.: 10/673,084

(22) Filed: Sep. 26, 2003

(65) Prior Publication Data

US 2005/0071638 A1 Mar. 31, 2005

(51) Int. Cl.
*H04L 9/00* (2006.01)

(52) U.S. Cl. ...................................... 713/171; 380/44
(58) Field of Classification Search ........ 713/169–177; 380/44
See application file for complete search history.

(56) References Cited

U.S. PATENT DOCUMENTS

| 5,737,419 | A  | * | 4/1998  | Ganesan ..................... 713/169 |
| 5,944,794 | A  | * | 8/1999  | Okamoto et al. ........... 709/225 |
| 6,832,313 | B1 | * | 12/2004 | Parker ........................ 713/150 |
| 6,886,095 | B1 | * | 4/2005  | Hind et al. ................. 713/168 |
| 2002/0101997 | A1 | * | 8/2002 | Curtis et al. ................ 380/279 |
| 2004/0068653 | A1 | * | 4/2004 | Fascenda .................... 713/168 |

* cited by examiner

*Primary Examiner*—Nasser Moazzami
*Assistant Examiner*—Mohammad W. Reza
(74) *Attorney, Agent, or Firm*—Buckley, Maschoff & Talwalkar LLC (57) ABSTRACT

According to some embodiments, network adapters may be used in remote management device key administration.

18 Claims, 9 Drawing Sheets

| NETWORK ADAPTER IDENTIFIER 302 | TYPE 304 | AVAILABLE 306 | STORING KEY 308 |
|---|---|---|---|
| NA_01 | LAN ON MOTHERBOARD | NOT AVAILABLE | NO |
| NA_02 | EXTERNAL | AVAILABLE | YES |
| NA_03 | EXTERNAL | AVAILABLE | NO |

REMOTE MANAGEMENT DEVICE KEY ADMINISTRATION USING NETWORK ADAPTERS

BACKGROUND

In some cases, it may be useful to manage a device from a remote location. For example, an Information Technology (IT) manager might access client devices, such as Personal Computers (PC) that are used by employees, in order to update software applications or to trouble-shoot problems with the client devices. To improve security in such situations (e.g., to prevent unauthorized access to the PCs), a client device might be provided with a key (e.g., a series of alphanumeric characters) that is associated with an authorized remote management device. In this way, the client device can use the key to authenticate information that is received from the remote management device.

DETAILED DESCRIPTION

Figure 1:
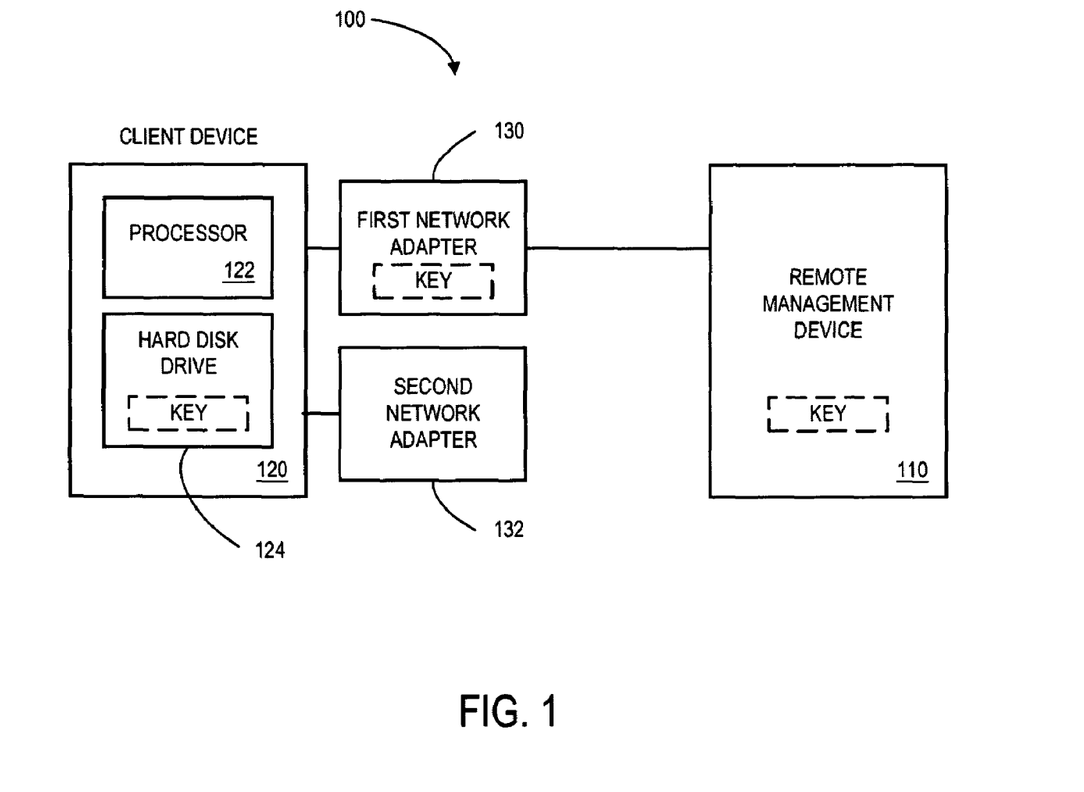
FIG. 1 is a block diagram of a remote management system.

FIG. 1 is a block diagram of a remote management system 100 in which a remote management device 110 may access a client device 120. For example, the remote management device 110 might access the client device 120 in accordance with the protocol defined in the Distributed Management Task Force (DMTF) document entitled "Alert Standard Format (ASF) Specification Version 2.0" (April 2003). Note that while a single client device 120 is illustrated in FIG. 1, the remote management device 110 might access any number of client devices.

The client device 120 may use a first network adapter 130 to communicate with the remote management device 110 through a network, such as a Local Area Network (LAN) or the Internet. By way of example, the first network adapter 130 might exchange packets of information in accordance with the Fast Ethernet LAN transmission standard 802.3-2002® published by the Institute of Electrical and Electronics Engineers (IEEE). One example of such a network adaptor is the INTEL® PRO/1000 Gigabit Server Adapter.

To improve the security of the system 100, both the remote management device 110 and the client device 120 may be provided with one or more symmetric keys. For example, a processor 122 at the client device 120 might be given a security key during an initialization process (e.g., when the client device 120 is initially configured to accept remote management access). The client device 120 may store the key, for example, on a hard disk drive 124 and/or provide the key to the first network adapter 130.

Storing the key on the hard disk drive 124, however, might not be sufficiently secure (e.g., because an unauthorized person or software program might access the key from the hard disk drive 124). As another approach, the key could be encrypted before it is stored on the hard disk drive 124. In this case, however, the appropriate encryption and decryption algorithms may need to be executed by the processor 122—making the software more complicated as well as risking the security of the system 100 (e.g., because an examination of the software might reveal the algorithms).

As another approach, the key could be stored at the first network adapter 130, such as by storing the key in an Electrically Erasable Programmable Read-Only Memory (EEPROM) or a Flash memory unit at the first network adapter 130. Although this solution might make it less likely that an unauthorized person or software program could access the key, a problem might arise if a second network adapter 132 is added to the client device 120 (e.g., to act as a back-up in case the first network adapter fails). That is, in order to provide the key to the second network adaptor 132 (e.g., to let the second network adapter 132 receive and authenticate ASF information), the key may need to be re-installed in the client device 120 (because in this approach the key was stored at the first network adapter 130 but not on the hard disk drive 124).

Figure 2:
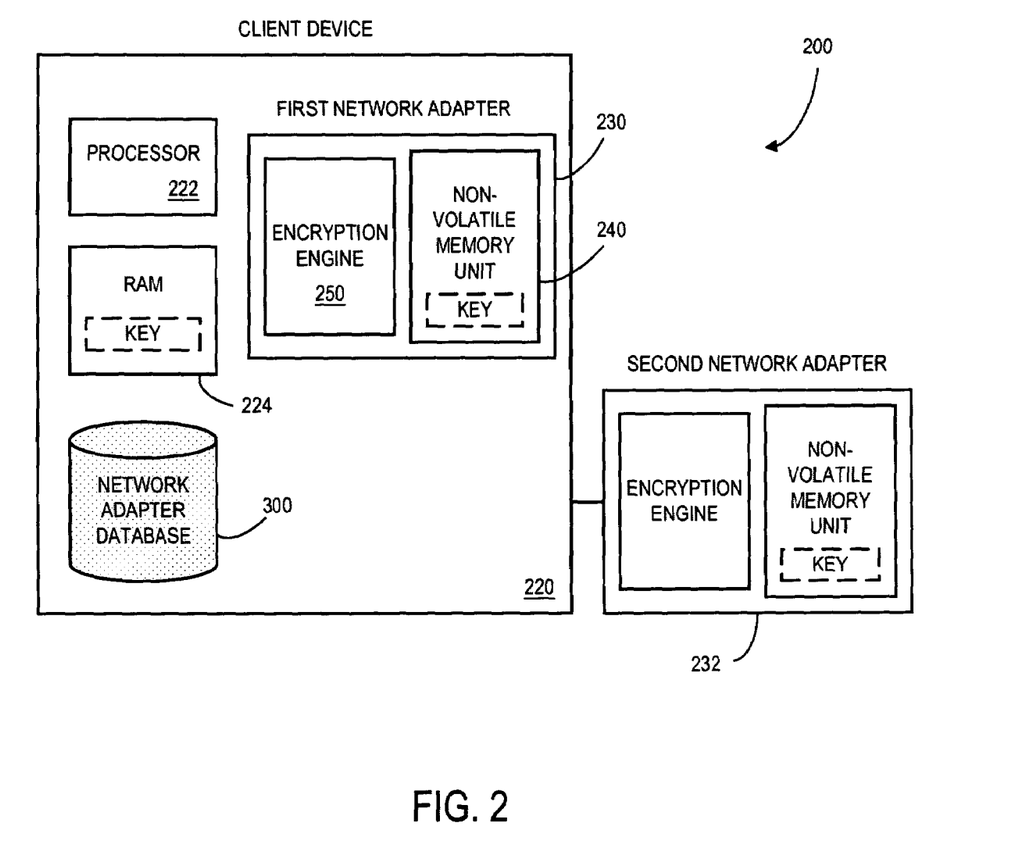
FIG. 2 is a block diagram including a client device according to some embodiments.

FIG. 2 is a block diagram of a system 200 that includes a client device 220 according to some embodiments. As before, the client device 220 may communicate with a remote management device (not illustrated in FIG. 2) via a first network adapter 230 and/or a second network adapter 232. In this case, the first network adapter 230 is a LAN-On-Motherboard network adapter while the second network adapter 232 is an external network adapter (although embodiments may be used with any types and/or configurations of network adapters).

Figure 3:
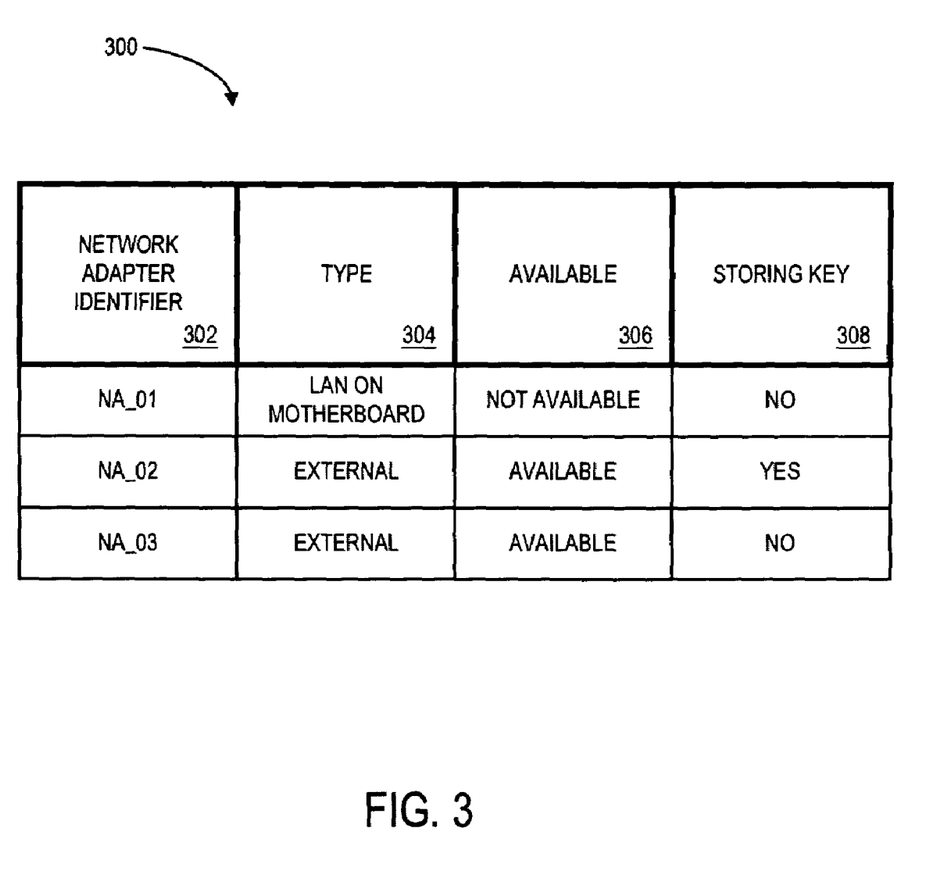
FIG. 3 is an example of a network adapter database according to some embodiments.

According to this embodiment, a processor 222 at the client device 220 includes an input "path" (e.g., a hardware and/or software path) to receive a key from the first network adaptor 230, the key being associated with a remote management device. The processor 222 may then store the key in a volatile memory unit, such as a Random Access Memory (RAM) unit 224. This might be performed, for example, when the client device 220 is turned on and/or an Operating System (OS) associated with the client device 220 is started. The client device 220 may also store an indication of which of the two network adapters 230, 232 is currently storing the key, such as writing the indication in a network adapter database 300 stored on a hard disk drive. In this way, the database 300 may be accessed when the client device 220 is powered-up in order to determine which of the two network adapters 230, 232 the processor 222 should read the key from.

As a result when the second network adapter 232 is going to receive and authenticate ASF information (e.g., when it become the active ASF adapter because the first network adapter 230 has failed), the processor 222 may retrieve the key from the memory unit 224 and store it to the second network adapter 232 via an output path.

FIG. 3 is an example of a network adapter database 300 that may be stored at the client device 220 according to some embodiments. The database 300 is provided only as an illustration, and embodiments may use any other types of information and/or arrangements. For example, the database 300 might be replaced with a simple network adapter name that indicates which network adapter is currently storing a key.

The database 300 of FIG. 3 includes entries for each network adapter in a system. Moreover, a network adapter identifier 302 (e.g., a name or other alphanumeric identifier) is provided for each network adapter.

The type 304 (e.g., indicating if the adapter is a "LAN On Motherboard" or an "external" adapter) and availability 306 (e.g., indicating whether or not the adapter is functioning properly) of each network adapter are also stored in the database 300. The type 304 and availability 306 might be used, for example, to a select a network adapter at which a key should be stored. According to some embodiments, the key is stored at a LAN On Motherboard type adapter if one is available (e.g., because that type of adapter is less likely to be removed from the system as compared to an external adapter).

An indication 308 as to whether or not each network adapter is currently storing the key is also provided in the database. In this way, the client device 220 can use the information in the database 300 to determine from which network adapter the processor 222 should retrieve the key. According to some embodiments, only one network adapter stores the key at any given time.

Figure 4:
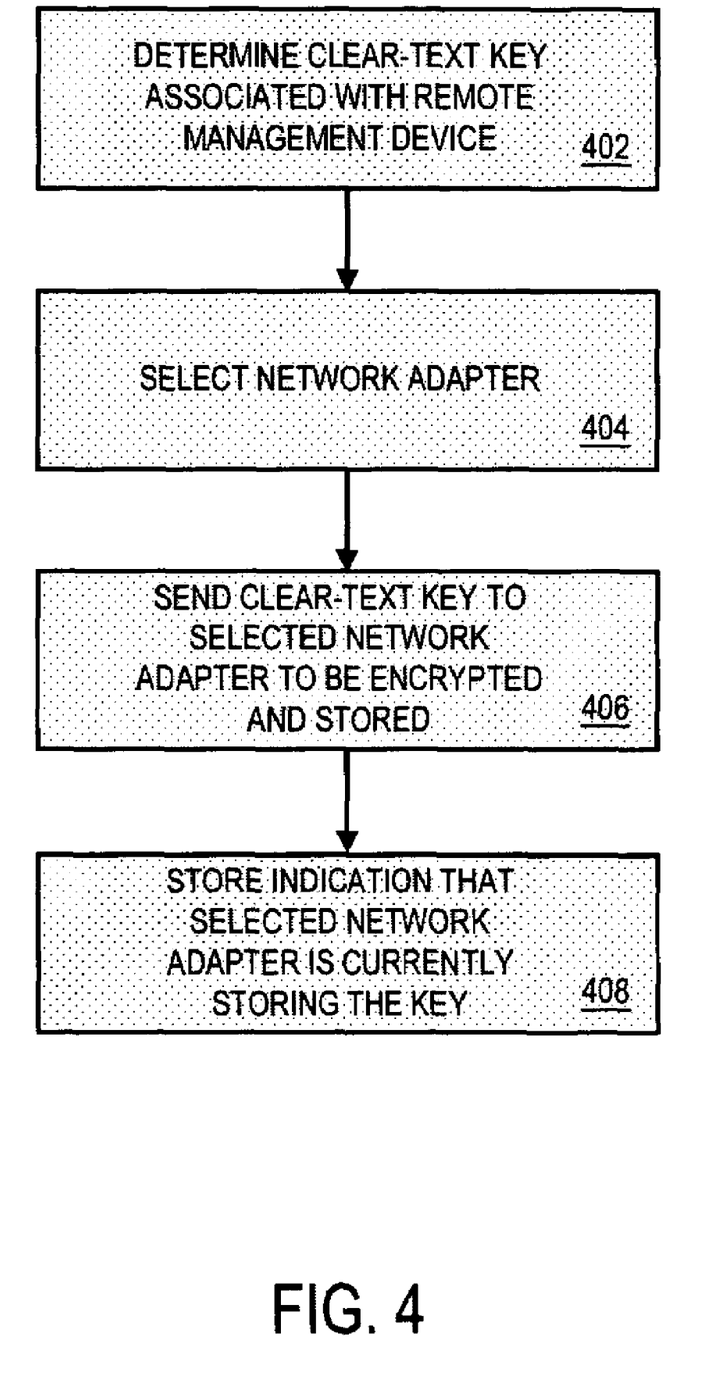
FIG. 4 is a flow chart of a client device initialization method according to some embodiments.

FIG. 4 is a flow chart of a client device initialization method according to some embodiments. The flow charts described herein do not necessarily imply a fixed order to the actions, and embodiments may be performed in any order that is practicable. The method of FIG. 4 may be associated with, for example, the client device described with respect to FIGS. 2 and 3. Note that any of the methods described herein may be performed by hardware, software (including microcode), or a combination of hardware and software. For example, a storage medium may store thereon instructions that when executed by a machine result in performance according to any of the embodiments described herein.

At 402, a clear-text key is determined during an initialization process at a client device, the key being associated with a remote management device. For example, the clear-text key might be read from an initialization Compact Disc (CD) provided by an IT manager.

At 404, a network adapter is selected. For example, the client device might select a LAN-On-Motherboard adapter over other available adapters (e.g., to reduce the likelihood that the adapter will later be removed).

At 406, the clear-text key is sent to the selected network adapter. For example, the client device might use the following function to send the clear-text key to the selected network adapter:

EncryptAndSetClearKeys ( ).

At 408, the client device stores an indication that the selected network adapter is currently storing the key. For example, the client device might update the storing key 308 entry in the network adapter database 300.

Figure 5:
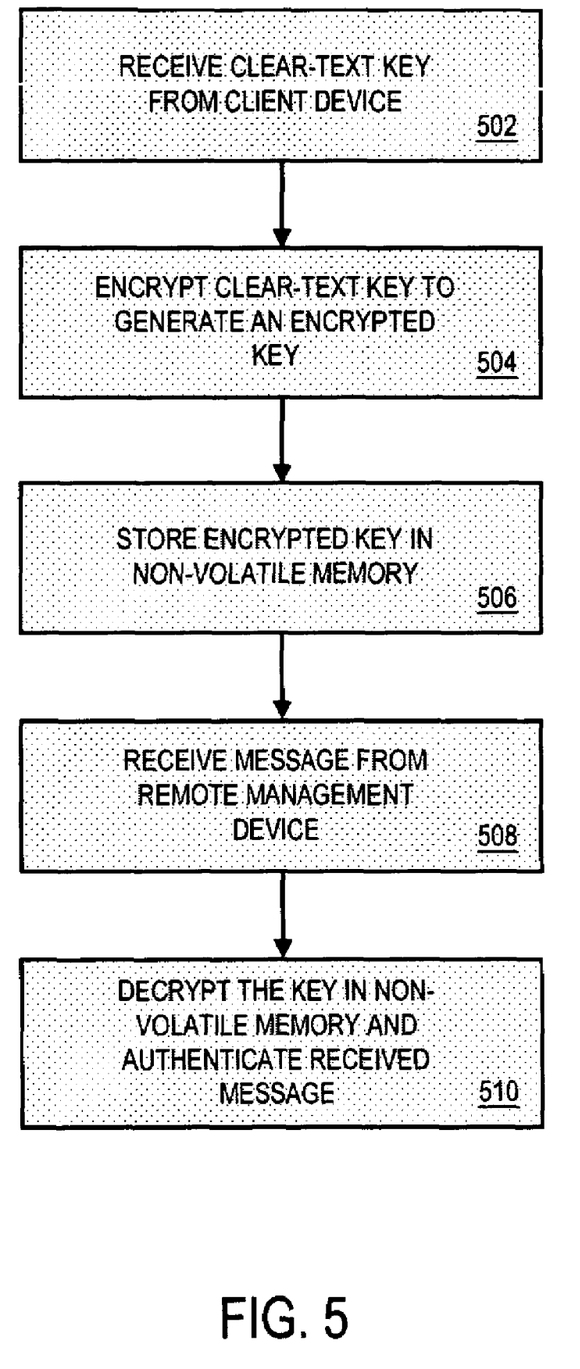
FIG. 5 is a flow chart of a network adapter method according to some embodiments.

FIG. 5 is a flow chart of a network adapter method according to some embodiments. At 502, a clear-text key is received from a client device (e.g., via the EncryptAndSetClearKeys ( ) function). The key is then encrypted at 504, and the encrypted key is stored in non-volatile memory at 506. Referring to FIG. 3, the network adapter 230 might encrypt the key using the encryption engine 250 and store the key in the non-volatile memory unit 240.

The network adapter receives a message from a remote management device 508. For example, the network adapter may receive a Remote Management and Control Protocol (RMCP) message indicating that that the client computer should be reset. The network adapter may then decrypt the encrypted key and use the decrypted key to authenticate the received message (e.g., so that an unauthorized person or device cannot reset the client device).

Figure 6:
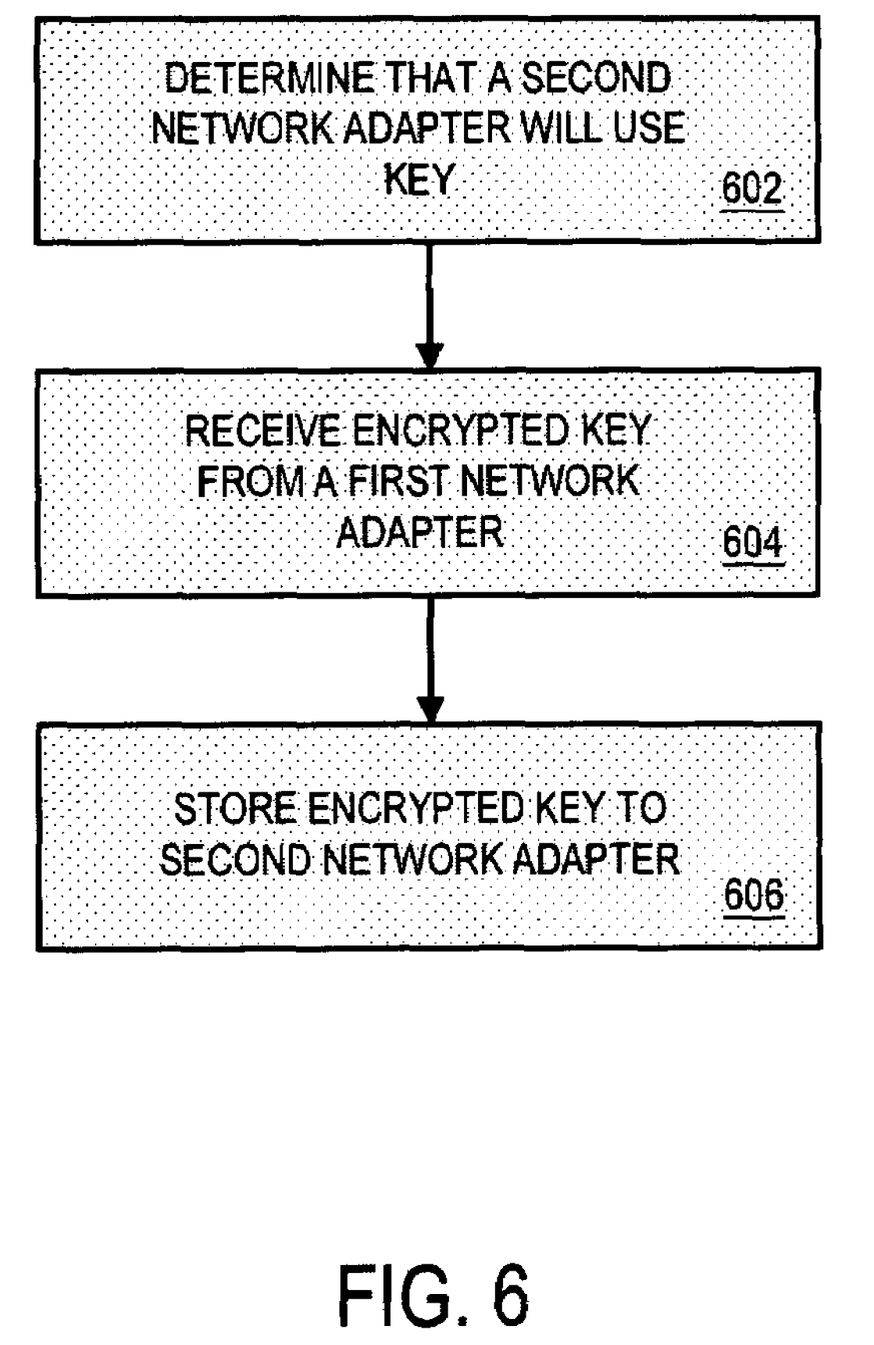
FIG. 6 is a flow chart of a client device method according to some embodiments.

FIG. 6 is a flow chart of a client device method according to some embodiments. In this case, assume that a first network adapter is currently storing the key (and that the first network adapter is the active ASF adapter).

At 602, it is determined that a second network adapter will use the key. For example, the client device might determine that the first network adapter is no longer active (e.g., it may have lost its network connection). As a result, the second network adapter will now act as the active ASF adapter (and therefore needs to have the key). As another example, a user might issue a command to change the active ASF adapter.

The client device receives an encrypted version of the key from the first network adapter at 604. For example, the client device might use the following function to receive the encrypted key:

GetEncryptedKeys ( ).

According to some embodiments, the encrypted key are obtained from the first network adapter in response to a determination that a new network adapter is going to need the key. According to other embodiments, the client devices gets the encrypted key when it powers-up (after looking in a database to determine which network adapter is currently storing the key), and the encrypted key is stored in a volatile memory unit (e.g., RAM). As a result, the encrypted key will be available even if the first network adapter completely and suddenly fails.

In either case, the encrypted key is stored to the second network adapter at 606. For example, the client device might use the following function to provide the encrypted key to the second network adapter:

SetEncryptedKeys ( ).

Note that when such a function is performed, the network adapter will simply store the key (e.g., without first encrypting the information).

According to some embodiments, two network adapters could store a key at the same time. Consider, for example, a client device that includes a first network adapter and a second network adapter, with the first network adapter acting as both the key storage adapter (e.g., the adapter from which the key will be retrieved after a power-up) and the active ASF adapter.

If a user indicates that the second network adapter should become the active ASF adapter, the key can be retrieved from the first network adapter and provided to the second network adapter. In this case, the client device could leave the key on the first network adapter (and retrieve the key from the first network adapter after a power-up). That is, since the first network adapter is functioning properly, there is no reason to make the second network adapter the key storage adapter.

If, on the other hand, the first network adapter is removed from the client device, the key may be provided from volatile memory to the second network adapter. In this case, of course, the second network adapter would become the key storage adapter (because the first network adapter is no longer available). An indication that the key is now stored in the second network adapter may then be written to a database (so that the client device will realize after the next power-up that the key is no longer stored in the first network adapter).

Figure 7:
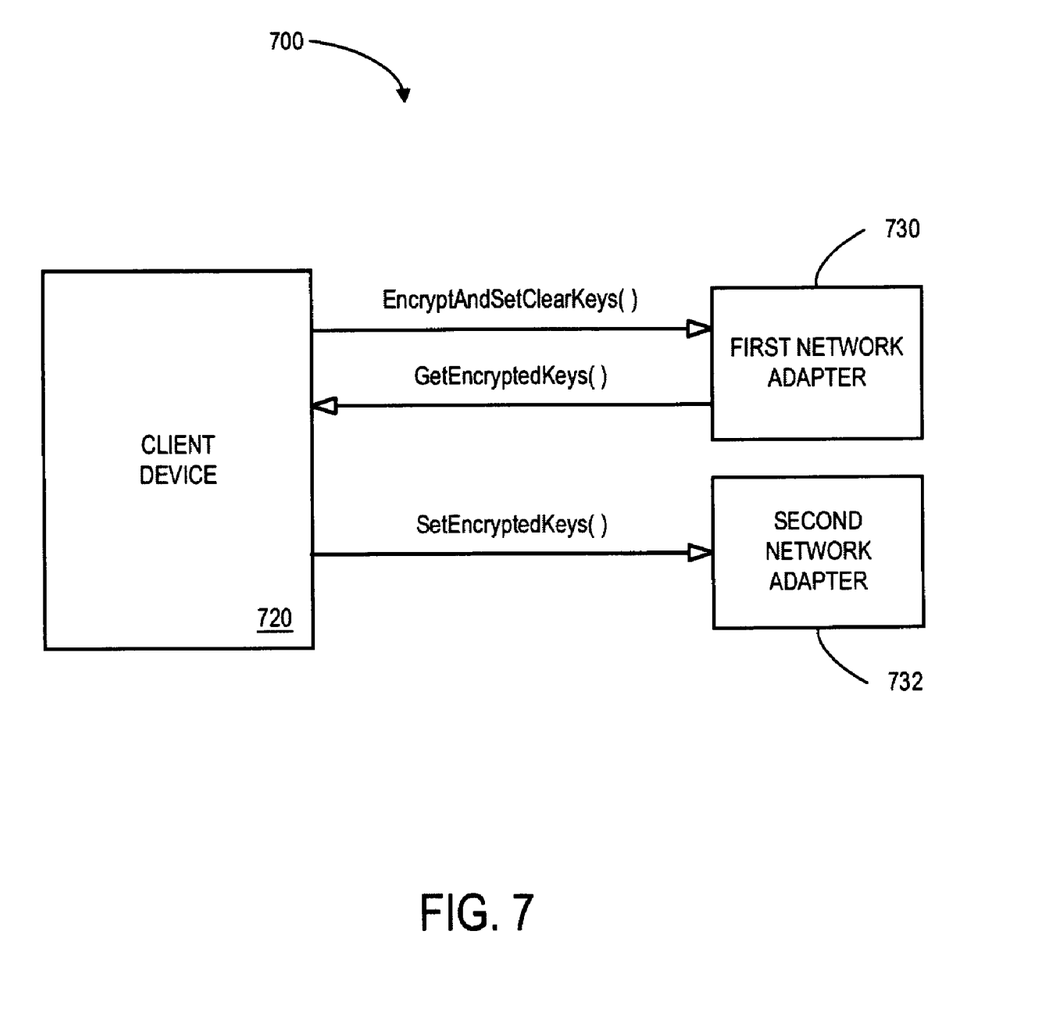
FIG. 7 is an information flow diagram of remote management key administration according to some embodiments.

FIG. 7 is an information flow diagram 700 of remote management key administration according to some embodiments. During an initialization procedure, the client device 720 may determine one (or more) clear-text keys and provide the clear-text key to the first network adapter 730 using the EncryptAndSetClearKeys ( ) function. The client device 720 may then store an indication on its hard disk drive that the first network adapter 730 is currently storing the key. In that way, after a power-up the client device 720 can access the hard disk drive, determine that the first network adapter 730 is currently storing the key, and retrieve the encrypted key from the first network adapter 730 using the GetEncryptedKeys ( ) function. The client device 720 may, for example, store the encrypted key in volatile memory (e.g., RAM).

At some later time, the client device 720 may determine that the first network adapter 730 has failed. In this case, the client device 720 may configure the second network adapter 732 as the active ASF adapter and send the encrypted key (from volatile memory) to the second network adapter 732 using the SetEncryptedKeys ( ) function. The second network adapter 732 may then use the key to authenticate an ASF message from a remote management device.

The client device 720 may also store an indication on its hard disk drive that the second network adapter 732 is now currently storing the key (e.g., so that after a power-up the client device 720 can realize that the key is stored at the second network adapter 732 instead of the first network adapter 730).

Figure 8:
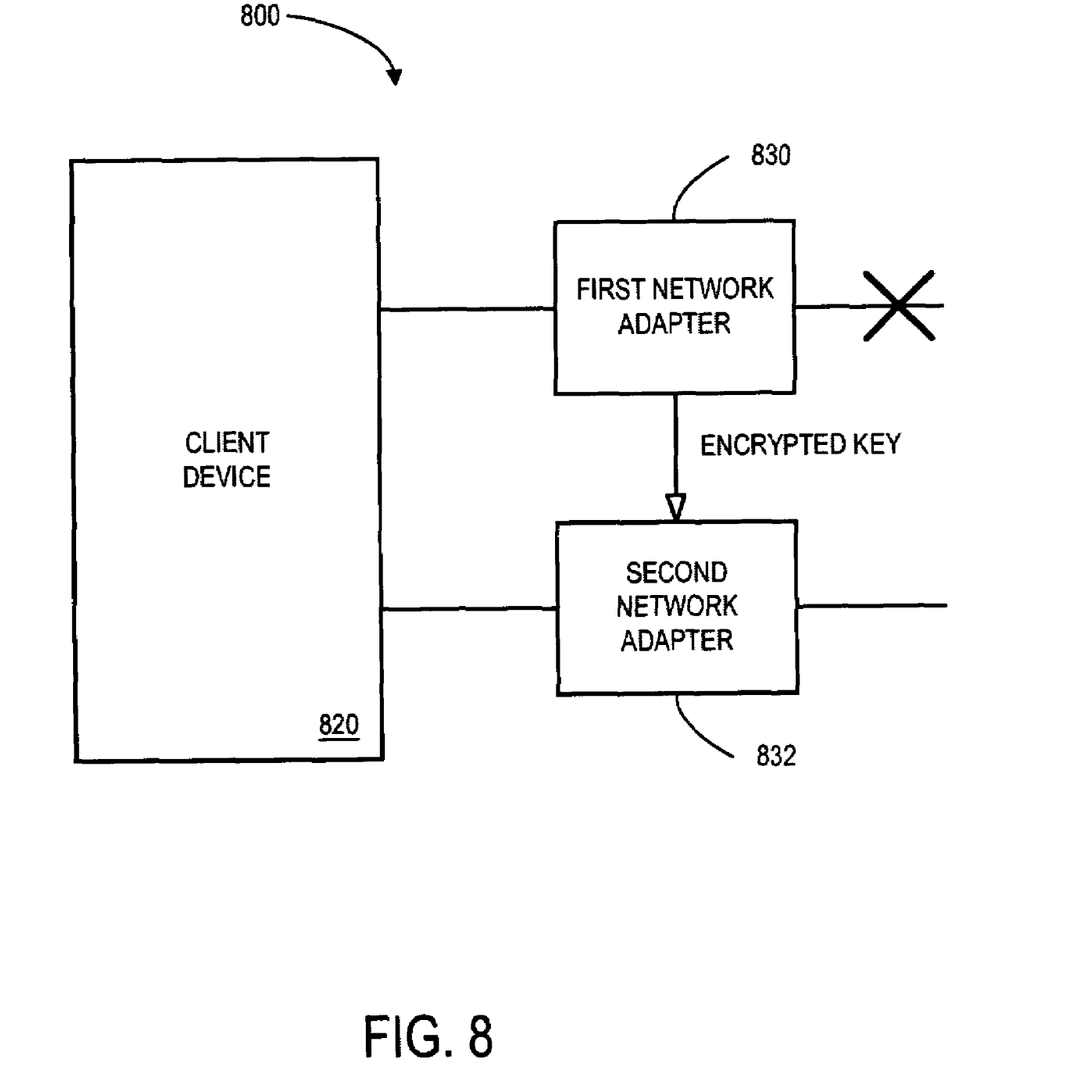
FIG. 8 is a block diagram including a client device according to another embodiment.

Note that in this embodiment, neither the clear-text nor encrypted version of the key is stored on the hard disk drive of the client device 820. Moreover, the client device does not perform an encryption or decryption algorithm on the key. As a result, the security of the system 800 may be improved.

In some cases, a network adapter authenticate an ASF message from a remote management device even when the client device has failed (e.g., the OS is hung-up) or is in a power-off state. According to some embodiments, a network adapter that is currently storing a key may provide the key to another network adapter even when the client device cannot arrange the transfer. For example, FIG. 8 is a block diagram including a client device 820 that has failed or is in power-off state according to such an embodiment.

In this case, the first network adapter 830 originally stores an encrypted key to be used to authenticate a message from a remote management device. If the first network adapter 830 fails for any reason (e.g., a connection between the first network adapter 830 and the remote management device is lost), it automatically provides the encrypted key to the second network adapter 832. For example, the encrypted key might be provided from the first network adapter 830 to the second network adapter 832 via a bus that operates in accordance with the Smart Battery System (SBS) Implementer's Forum specification entitled "System Management Bus (SMBus) Version 2.0" (August 2000). The second network adapter 832 may then use the key to authenticate any ASF message received from the remote management device.

Figure 9:
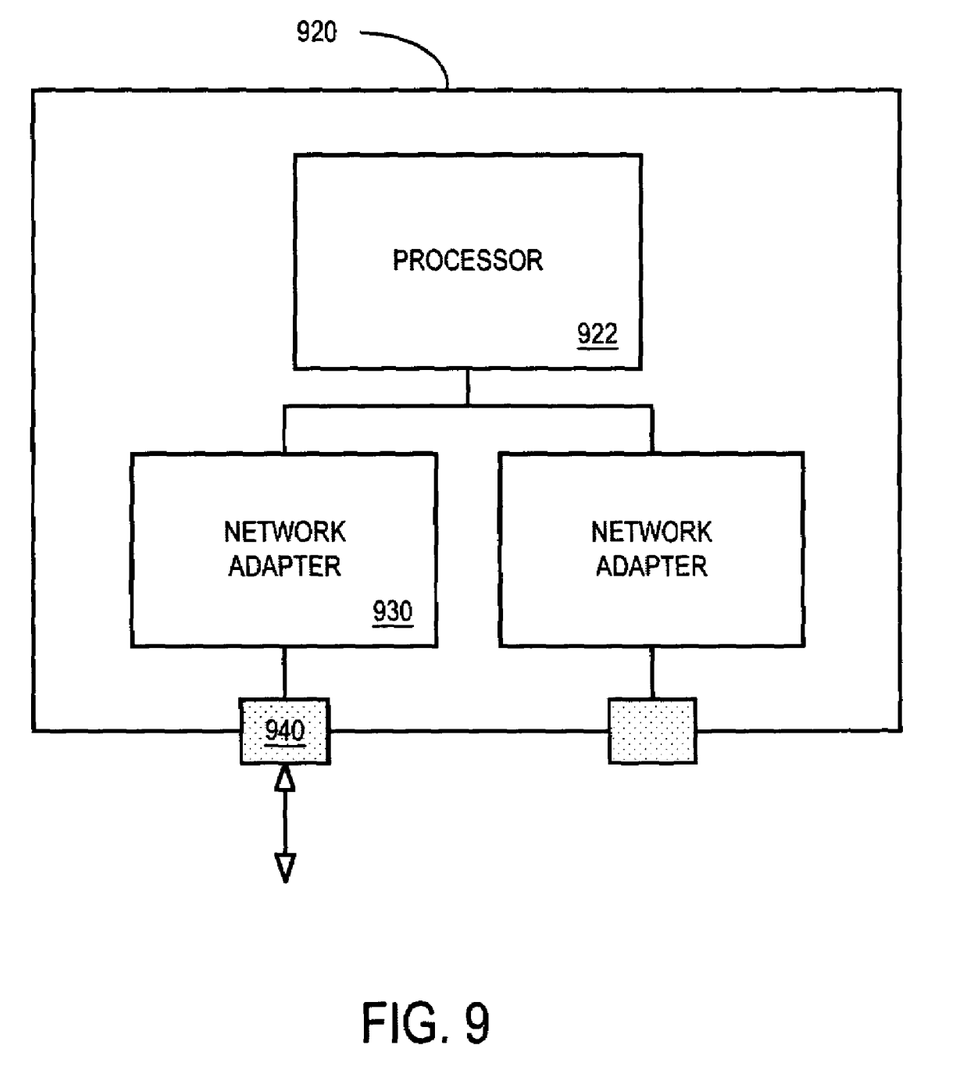
FIG. 9 is a block diagram of a system according to some embodiments.

FIG. 9 is a block diagram of a client device 920 according to some embodiments. The client device 920 may include, for example, a processor 922 adapted to communicate with other devices via a network adapter 930 coupled between the processor 922 and an Ethernet port 940. Note that the client device 920 may include a number of network adapters and may administer remote management keys for the adapters in accordance with any of the embodiments described herein (e.g., by storing and/or transferring keys to network adapters).

The following illustrates various additional embodiments. These do not constitute a definition of all possible embodiments, and those skilled in the art will understand that many other embodiments are possible. Further, although the following embodiments are briefly described for clarity, those skilled in the art will understand how to make any changes, if necessary, to the above description to accommodate these and other embodiments and applications.

Although some embodiments have been described with respect to ASF information, embodiments may be used with respect to other systems for which keys may need to be administered. Moreover, although particular configurations of client devices and/or network adapters have been described, embodiments may be used with any other configuration. For example, a client device might include a LAN On Motherboard network adapter and another adaptor connected through a bus as defined in the Peripheral Component Interconnect (PCI) Standards Industry Group (SIG) standard entitled "Conventional PCI 2.2" or "PCI Express 1.0."

The several embodiments described herein are solely for the purpose of illustration. Persons skilled in the art will recognize from this description other embodiments may be practiced with modifications and alterations limited only by the claims.

What is claimed is:

1. A method, comprising:
   powering up a client device and initializing a initialization process;
   determining a clear-text key during the initialization process;
   providing the clear-text key to a first network adapter, wherein the first network adapter is to encrypt the clear-text key and store the encrypted key;
   receiving at a client device the encrypted key from the first network adaptor, the key being associated with a remote management device, wherein the client device comprises the first network adapter and a second network adapter, and wherein the client device is to communicate with the remote management device via the first network adapter;
   storing an indication at the client device that the key is currently stored at the first network adapter and not at the second network adapter;
   storing the key at the second network adapter; and
   storing an indication at the client device that the key is currently stored at the second network adapter and not the first network adapter.

2. The method of claim 1, wherein the key is stored in a non-volatile storage unit at the second network adapter.

3. The method of claim 1, wherein an encrypted version of the key is received from the first network adaptor and stored at the second network adapter.

4. The method of claim 1, further comprising prior to said receiving:
   determining that the second network adapter is to communicate with the remote management device.

5. The method of claim 4, wherein the determination of the second network adapter is based on a determination that the first network adapter is no longer able to communicate with the remote management device.

6. The method of claim 1, wherein the received key is stored in a volatile memory unit at the client device, and said storing further comprises:
   retrieving the key from the volatile memory unit; and
   storing the key at a second network adapter.

7. The method of claim 1, further comprising prior to said receiving:
selecting the first network adapter from a group of available network adapters, wherein the client device comprises the group of available network adapters.

8. The method of claim 7, wherein an available network adapter on a motherboard is selected before a network adapter that is not on the motherboard.

9. The method of claim 1, wherein the key is to be used to authenticate an alert standard format message from the remote management device.

10. The method of claim 1, further comprising:
losing a connection between the first network adapter and the remote management device prior to storing the key at the second network adapter.

11. An apparatus, comprising:
a storage medium having stored thereon instructions that when executed by a machine result in the following:
powering up a client device and initializing a initialization process;
determining a clear-text key during the initialization process;
providing the clear-text key to a first network adapter, wherein the first network adapter is to encrypt the clear-text key and store the encrypted key;
receiving at a client device the encrypted key from the first network adaptor, the key being associated with a remote management device, wherein the client device comprises the first network adapter and a second network adapter, and wherein the client device is to communicate with the remote management device via the first network adapter;
storing an indication at the client device that the key is currently stored at the first network adapter and not at the second network adapter;
losing a connection between the first network adapter and the remote management device;
storing the key at the second network adapter; and
storing an indication at the client device that the key is currently stored at the second network adapter and not the first network adapter.

12. The apparatus of claim 11, wherein an encrypted version of the key is received from the first network adaptor and stored at the second network adapter.

13. The apparatus of claim 11, wherein execution of the instructions further results in, prior to said receiving:
determining that the second network adapter is to communicate with the remote management device.

14. The apparatus of claim 13, wherein the determination of the second network adapter is based on a determination that the first network adapter is no longer able to communicate with the remote management device.

15. The apparatus of claim 11, wherein the received key is stored in a volatile memory unit at the client device, and said storing further comprises:
retrieving the key from the volatile memory unit, and
storing the key at a second network adapter.

16. The apparatus of claim 11, wherein execution of the instructions further results in, prior to said receiving:
selecting the first network adapter from a group of available network adapters, wherein the client device comprises the group of available network adapters.

17. The apparatus of claim 16, wherein an available network adapter on a motherboard is selected before a network adapter that is not on the motherboard.

18. The apparatus of claim 11, wherein the key is to be used to authenticate an alert standard format message from the remote management device.

* * * * *